US012716519B2

(12) United States Patent
Kälin et al.

(10) Patent No.: US 12,716,519 B2
(45) Date of Patent: Aug. 25, 2026

(54) OPERATING METHOD FOR A VALVE SYSTEM, COMPUTER PROGRAM PRODUCT, CONTROL UNIT, VALVE ACTUATING APPARATUS, VALVE SYSTEM AND SIMULATION PROGRAM PRODUCT

(71) Applicant: Siemens Aktiengesellschaft, Munich (DE)

(72) Inventors: Claus Kälin, Linkenheim (DE); Nicolas Grein, Kandel (DE); Dirk Elger, Jockgrim (DE); Eric Eggert, Wörth am Rhein (DE)

(73) Assignee: Siemens Aktiengesellschaft, Munich (DE)

( * ) Notice: Subject to any disclaimer, the term of this patent is extended or adjusted under 35 U.S.C. 154(b) by 416 days.

(21) Appl. No.: 18/232,849

(22) Filed: Aug. 11, 2023

(65) Prior Publication Data

US 2024/0052949 A1 Feb. 15, 2024

(30) Foreign Application Priority Data

Aug. 15, 2022 (DE) ........................ 102022208451.9

(51) Int. Cl.
*F16K 37/00* (2006.01)

(52) U.S. Cl.
CPC ................................ *F16K 37/0083* (2013.01)

(58) Field of Classification Search
CPC ............... F16K 37/0083; F16K 31/126; F16K 37/0041; F16K 1/38; F16K 1/32; F16K 31/12
See application file for complete search history.

(56) References Cited

U.S. PATENT DOCUMENTS

2005/0092272 A1 * 5/2005 Shindou .................. F01L 1/344 123/90.16
2009/0133573 A1 5/2009 Kleegrewe et al.
(Continued)

FOREIGN PATENT DOCUMENTS

CN 102536372 A * 7/2012
DE 102007039716 2/2009
(Continued)

OTHER PUBLICATIONS

Examination Report dated May 2, 2023 based on DE102022208451.9.

*Primary Examiner* — Eman A Alkafawi
*Assistant Examiner* — Dilara Sultana
(74) *Attorney, Agent, or Firm* — Cozen O'Connor

(57) ABSTRACT

Operating method for a valve system, computer program product, controller, valve actuator, valve system and simulation program product, where a valve is moveable between first and second end positions, the valve system is initially made available in an active operating state, the first end position of the valve is approached by actuating the valve actuator and the first end position is detected as a first absolute position of an actuating shaft and, alternatively or additionally, the second end position of the valve is approached by actuating the valve actuator and the second end position is detected as a second absolute position of the actuating shaft, a design of the valve is identified via the first and/or second absolute position of the actuating shaft by an algorithm, and the identified design of the valve is transmitted by the valve actuating apparatus to a controller and/or is parameterized via the identified design.

15 Claims, 3 Drawing Sheets

(56) References Cited

U.S. PATENT DOCUMENTS

| | | | | |
|---|---|---|---|---|
| 2009/0145291 | A1 | 6/2009 | Kleegrewe et al. | |
| 2017/0286572 | A1 | 10/2017 | Hershey et al. | |
| 2017/0307103 | A1* | 10/2017 | Freudendahl | F16K 37/0041 |
| 2019/0113910 | A1 | 4/2019 | Wagner-Stuerz | |
| 2022/0413454 | A1* | 12/2022 | Nishizawa | G05B 23/0283 |

FOREIGN PATENT DOCUMENTS

| | | | | |
|---|---|---|---|---|
| DE | 102007058776 | | 6/2009 | |
| DE | 102018133428 | A1 * | 6/2020 | G05B 19/042 |
| EP | 3112733 | | 1/2017 | |
| EP | 3112733 | A1 * | 1/2017 | F16K 37/0041 |
| EP | 3403012 | | 11/2018 | |
| EP | 3473907 | | 4/2019 | |

* cited by examiner 21, 31, 120
30, 100
32
50, 52, 55
10, 13
25
20
35
110
60, 62
40, 41
36, 150
16
50, 52, 55
28
40, 42
45
23, 33, 130
29
44

OPERATING METHOD FOR A VALVE SYSTEM, COMPUTER PROGRAM PRODUCT, CONTROL UNIT, VALVE ACTUATING APPARATUS, VALVE SYSTEM AND SIMULATION PROGRAM PRODUCT

BACKGROUND OF THE INVENTION

1. Field of the Invention

The invention relates to an operating method for a valve system and a computer program product with which the operating method can be performed, a corresponding control unit and a valve actuating apparatus, a valve system and a corresponding simulation program product.

2. Description of the Related Art

DE 10 2007 039 716 B4 discloses a method for identifying the drive type of an actuating drive, where an actuating range of the actuating drive is completely traversed. Here, feedback angular positions are recorded and a range is determined between end angular positions at the actuating range limits of the drive type.

DE 10 2007 058 776 A1 discloses a method for identifying the drive type of an actuating drive, where the actuating drive is moved within its working range over a predeterminable distance. In so doing, angular positions that correspond to pressures in at least one pressure means supply line of the actuating drive are detected. These are compared with transmission characteristic curves of known drive types.

Valve systems are used in a broad range of applications in automation technology. In particular, different design types of valves are combined with different valve actuating apparatuses. Parameterization of valve systems is therefore complex and frequently requires manual intervention. Accordingly, manual assembling and parameterizations are prone to errors.

SUMMARY OF THE INVENTION

It is an object of the invention is to simplify and accelerate commissioning of a valve system.

This and other objects and advantages are achieved in accordance with the invention by an operating method in accordance with the invention for a valve system, where the valve system comprises a valve that is coupled in an assembled state to a valve actuating apparatus. The valve actuating apparatus comprises an actuating shaft which, in order to actuate the valve, is connected in a torque-transmitting or tensile force-transmitting manner to the valve. The torque-transmitting or tensile force-transmitting connection can be established in a direct or indirect manner. The valve is movable between a first and a second end position, where the end positions are essentially stops of the valve. The disclosed operating method in accordance with the invention comprises a first step in which the valve system is made available in an active operating state. In the active operating state, the valve and the valve actuating apparatus are assembled according to the intended use and can be actuated. A second step is subsequently performed in which the first end position of the valve is approached by actuating the valve actuating apparatus. Here, the first position is achieved as soon as it is detected as a first absolute position of the actuating shaft. For this purpose, a position of the actuating shaft is detected during the presence of the first end position and stored at least temporarily as a first absolute position. Alternatively or additionally, a third step is performed in the disclosed operating method in accordance with the invention. In the third step, corresponding to the second step, a second end position of the valve is approached by actuating the valve actuating apparatus. Likewise, the second end position is detected as a second absolute position of the actuating shaft. The second absolute position is stored at least temporarily.

Furthermore, the disclosed operating method comprises a fourth step in which a design type of the valve is identified with the aid of the first and/or second absolute position of the actuating shaft. In so doing, the design type of the valve is identified with the aid of an algorithm which can be executed, for example, in a control unit (controller) of the valve actuating apparatus. The algorithm can be established so as in a rule-based manner to identify the design type from the values of the first and/or second absolute position of the actuating shaft. Alternatively or additionally, the algorithm can identify the design type of the valve by comparing the first and/or second absolute position with table values.

Furthermore, in the disclosed operating method in accordance with the invention, the identified design type of the valve is transmitted to the control unit (controller) via which the valve can be actuated. Alternatively or additionally, the valve actuating unit can be parameterized based on the identified design type of the valve. For this purpose, at least one associated parameter can be determined with the aid of the algorithm, for example, using a database. Here, a parameter is also to be understood as a configuration value and parameterization is also to be understood as configuration. Overall, it is thus possible to identify the design type in a more exact automatic manner, which renders possible a largely automatic configuration operation during the assembly of the valve system. End positions or their corresponding absolute values can be stored in a memory-space saving manner so that it is possible to hold readily available a comprehensive collection of end positions or absolute values that can also be upgraded in a simple manner.

In one embodiment of the disclosed operating method, identifying the design type of the valve, in other words the fourth step, comprises distinguishing between a stroke-actuated and a pivot-actuated valve. A stroke-actuated valve can be distinguished from a pivot-actuated valve by way of example by a respective position of the first and second absolute position. Usually, pivot-actuated valves have a large angular field between the first and second absolute position than stroke-actuated valves. The distinction between a stroke-actuated and a pivot-actuated operation can be made by way of example via table values and/or by using a trainable artificial intelligence, in particular a neuronal network. The disclosed operating method is configured to also categorize unknown design types of valves in stroke-actuated and pivot-actuated valves. Moreover, the fourth step can compare the first and/or second absolute position with an adjustable type limit value. Depending on whether the first and/or second absolute value exceeds or is below the adjustable type limit value in terms of amount, it is possible to distinguish whether the valve is a stroke-actuated or a pivot-actuated valve.

In particular, in the claimed disclosed operating method, the angular field that is delimited by the first and second absolute position of the actuating shaft can be formed as divided with an asymmetrical design from a neutral position of the valve actuating apparatus. Consequently, it is possible for an angle between the first absolute position and the neutral position to be different than an angle between the second absolute position and the neutral position. The asymmetrical design of the valve compared to the neutral position renders it possible to utilize a characteristic design feature of valve actuating apparatuses. The accuracy when identifying the design type of the valve is thus further increased. This function can also be used via the algorithm of the fourth step of the claimed disclosed operating method. Moreover, the position of the first and second absolute position during the operation of the valve can be performed repeatedly and compared with the associated historical values. It is possible hereby by way of example to identify wear on the valve, on the valve actuating apparatus and/or on a valve connection element between the valve and the actuating shaft. This can be performed inter alia by the algorithm that is used in the fourth step.

Furthermore, it is possible in the disclosed operating method to couple the algorithm that is used in the fourth step to the valve actuating apparatus via a communicative data connection. The algorithm can be stored and executed by way of example on a hardware platform that is separate from the valve actuating apparatus, where the hardware platform is, for example, a programmable logic controller (PLC), a host computer or a computer cloud. A communicative data connection is understood to mean inter alia a field bus, a computer network, in particular Ethernet or a wireless connection, by way of example WLAN, Zigbee, Bluetooth, or a mobile phone connection such as 3G, 4G or 5G. The disclosed operating method can be divided into functions so that the algorithm can be updated centrally in a simple manner. Furthermore, the algorithm can thus be executed on a hardware platform with increased computing power, on which it can also be further developed, for example, by training with newly acquired training data. The disclosed operating method can consequently be adapted in a simple manner and has an extended possible serviceable life.

Furthermore, the fourth step of the disclosed operating method in which the design type of the valve is identified can comprise interchanging the values of the first and second absolute position with one another. Alternatively or additionally, the signs of the first and second absolute position can be reversed in the fourth step. As a result, a broad range of assembly positions of the valve and/or of the valve actuation can be easily processed. In particular, it is possible to avoid error messages being output, whereby manual interventions by a user are minimized by the disclosed operating method. The first and second absolute positions can be interchanged or their signs reversed with the aid of adjustable rules. By way of example, it is always possible using a rule that is stored in the algorithm to convert negative values for absolute positions into positive values. Furthermore, it is possible using a rule that is stored in the algorithm to sort the first and second absolute position by way of example in such a manner that the first or second absolute position always has the higher value. This allows a simplified identification of the design type of the valve. As a consequence, a configuration operation of the valve system is further simplified.

Moreover, it is possible with the disclosed operating method to design the actuating shaft so as to predefine an assembly position of a valve connection element, via which the valve can be releasably connected to the actuating shaft. The actuating shaft can be particularly designed such that the valve connection element can only be fastened to the actuating shaft in discrete assembly positions. As a result, depending upon the design type of the valve, only a limited number of positions is possible for the first and second absolute position. Such a limited number of first and second absolute positions can be distinguished with reduced computing effort. As a result, the disclosed operating method can be used in the case of a broad range of design types of valves in different assembly positions. Moreover, the actuating shaft and/or the valve connection element can be designed in such a manner that the first and/or second absolute position that is determined in the inventive method exceeds or is below the amount of the type comparison value. The actuating shaft and/or the valve connection element can also be designed in such a manner that it is possible in the case of the inventive method to determine a first and/or second absolute position which are design type specific. Accordingly, design types of valves can be distinguished in each case by characteristic end positions and consequently a first and/or second absolute position that is detected by the disclosed method.

Moreover, the actuating shaft can have a spring groove, a spring, a flat, an engagement end for a tool, and/or an oriented molding so as to predefine an assembly position of the valve connection element. Spring grooves, springs, flats, engagement ends for tools and oriented moldings can be produced in a simple manner with a high degree of precision. Likewise, as a result, depending upon the design type of valve, the number of possible absolute positions of the valve actuating apparatus is limited, whereby the design type of the valve can be identified in a more exact manner.

In a further embodiment of the disclosed operating method, a fifth step is performed, in which the actuating range of the valve actuating apparatus is set, where the actuating range lies between the first and second absolute position. In so doing, the actuating range can overlap at least in part the angular field between the first and second absolute position. It is possible using the actuating range to predefine the position range of the actuating shaft and said position range can be activated in an intended operation. This makes it possible to avoid a stop on at least one end position of the valve, such as in an open position, which leads to reduced wear. Predefining the actuating range can be part of parameterizing the valve actuating apparatus in accordance with the fourth step of the operating method. Furthermore, the actuating range can also be created by a user specification, where predefined actuation ranges can be provided to the user for selection, for example. The predefined actuating ranges can be predefined, for example, by an intended application. Moreover, it is possible to predefine maximum actuating speeds or actuating accelerations for the entire actuating range or for segments of the actuating range. It is also possible for this purpose to provide predefined values to the user for selection. Furthermore, the actuating range can be predefined in dependence upon the identified design type of the valve by a value table and/or by the algorithm. In so doing, the algorithm can be designed as artificial intelligence, for example, as a neuronal network. Overall, such a valve system can be expediently parameterized quickly and reliably for an intended application. The structure of the underlying valve system is thus further simplified.

The objects and advantages in accordance with the invention are likewise achieved by a computer program product that is established to operate a valve system. The valve system comprises a valve and a valve actuating apparatus that are connected to one another in an assembled state. The computer program product comprises commands which can be executed by a computer and which cause the computer to identify a design type of the valve. The computer program product can be executed on a control unit (controller) that is at least coupled to the valve actuating apparatus. The valve actuating apparatus can comprise the control unit, in other words can be designed as a local control unit, or the control unit can be at least functionally assigned to the valve actuating apparatus. For this purpose, the control unit and the valve actuating apparatus can be coupled via a communicative data connection. The control unit that is coupled via the communicative data connection is consequently formed as a superordinate control unit. In accordance with the invention, the computer program product is established to perform at least one operating method in accordance with one of the above-illustrated embodiments. The computer program product comprises for this purpose commands which, when executed, cause a computer to perform the corresponding operating method. The features of the claimed operating method can be accordingly easily transferred directly to the computer program product in accordance with the invention.

In a similar manner, the objects and advantages in accordance with the invention are achieved by a control unit (controller). The control unit is configured to operate a valve actuating apparatus. For this purpose, the control unit is configured to output control commands that can be executed by the valve actuating apparatus. The control unit can be formed as a local control unit which is comprised by the valve actuating apparatus. Alternatively, the control unit can be designed as a superordinate control unit that can be coupled to the valve actuating apparatus via a communicative data connection. The superordinate control unit consequently represents a hardware platform that is separate from the valve actuating apparatus. In accordance with the invention, the control unit is configured to implement at least one embodiment of the disclosed operating method. For this purpose, the control unit can be equipped, for example, with a computer program product in accordance with an above-described embodiment.

Furthermore, the objects and advantages are achieved in accordance with the invention by a valve actuating apparatus that comprises a valve driver and an actuating shaft. The actuating shaft is configured to actuate a valve that is coupled to the valve actuating apparatus, i.e., to open, to close and/or assume a predeterminable valve position between an open and a closed position. In accordance with the invention, the actuating shaft has a spring, a spring groove, a flat, an engagement end for a tool and/or an oriented molding. These are used individually or in combination for automatically identifying a design type of a connected valve. By way of example, the actuating shaft can be structured such that, in an intended assembled state and when the valve actuating apparatus is in a neutral position between its first and second end position which corresponds to the first and second absolute position of the valve actuating apparatus, the valve divides the corresponding angular field in an asymmetrical manner. As a result, the valve actuating apparatus can be configured such that, for example, valves of a design type series have an angular field that is divided in a similar asymmetrical manner. The design types of the design type series can be distinguished from one another by their absolute positions. The disclosed operating method can be supported by an appropriately configured valve actuating apparatus and can be performed with an increased degree of identification accuracy.

Likewise, the objects and advantages are achieved in accordance with the invention by a valve system, where the valve system comprises a valve and a valve actuating apparatus that can be connected to one another. The valve actuating apparatus is coupled to a control unit. In accordance with the invention, the control unit is configured in accordance with one of the above-disclosed embodiments. Alternatively or additionally, the valve actuating apparatus is configured in accordance with one of the above-disclosed embodiments. As a result, the valve system in accordance with the invention can be automatically set in operation in a simple manner, in other words can be automatically configured or parameterized.

The objects and advantages are also achieved in accordance with the invention in a similar manner by a simulation program product, where the simulation program product is configured to simulate an operating method of a valve system. For this purpose, the simulation program product has commands which, when executed on a computer, cause the computer to simulate the operating behavior of the valve system. The valve system that is to be simulated comprises a valve and a valve actuating apparatus that is coupled thereto. The simulation program product comprises moreover a digital image of the valve and/or of the valve actuating apparatus of the valve system that is to be simulated. In accordance with the invention, the simulation program product is suitable for simulating an operating method in accordance with the disclosed embodiments. The digital image of the valve and/or of the valve actuating apparatus can be established as "digital twins", as described for example in the U.S. Pub. No. 2017/286572 A1, the contents of which are incorporated by reference herein in its entirety. The simulation program product can be formed in a monolithic manner, i.e., can be implemented completely on a hardware platform. Alternatively, the simulation program product can be formed in a modular manner and can comprise a number of programs part that can be executed on a separate hardware platform. The end positions of valves can be determined in a simple manner by simulation. Likewise, the identification based thereon of the design type of the associated valve can be simulated in a simple manner true to reality. Accordingly, commissioning and/or modification of a complex automation system can be simulated with reduced computing power even if a large number of valve systems are used. This makes it possible, for example, to determine which valve systems in the automation system can be expected to be configured or parameterized automatically and which valve systems are at risk of false detection. Accordingly, the amount of work involved in commissioning or converting the automation system can be predicted more precisely. As a result, in turn commissioning or conversion can be carried out more quickly.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in detail below with the aid of individual embodiments in figures, where the figures are to be read as complementary to one another in that the same reference characters in different figures have the same technical meaning, the features of the individual embodiments can also be combined with one another, and the embodiments that are illustrated in the figures can be combined with the features outlined above, in which.

DESCRIPTION OF THE EXEMPLARY EMBODIMENTS

Figure 1:
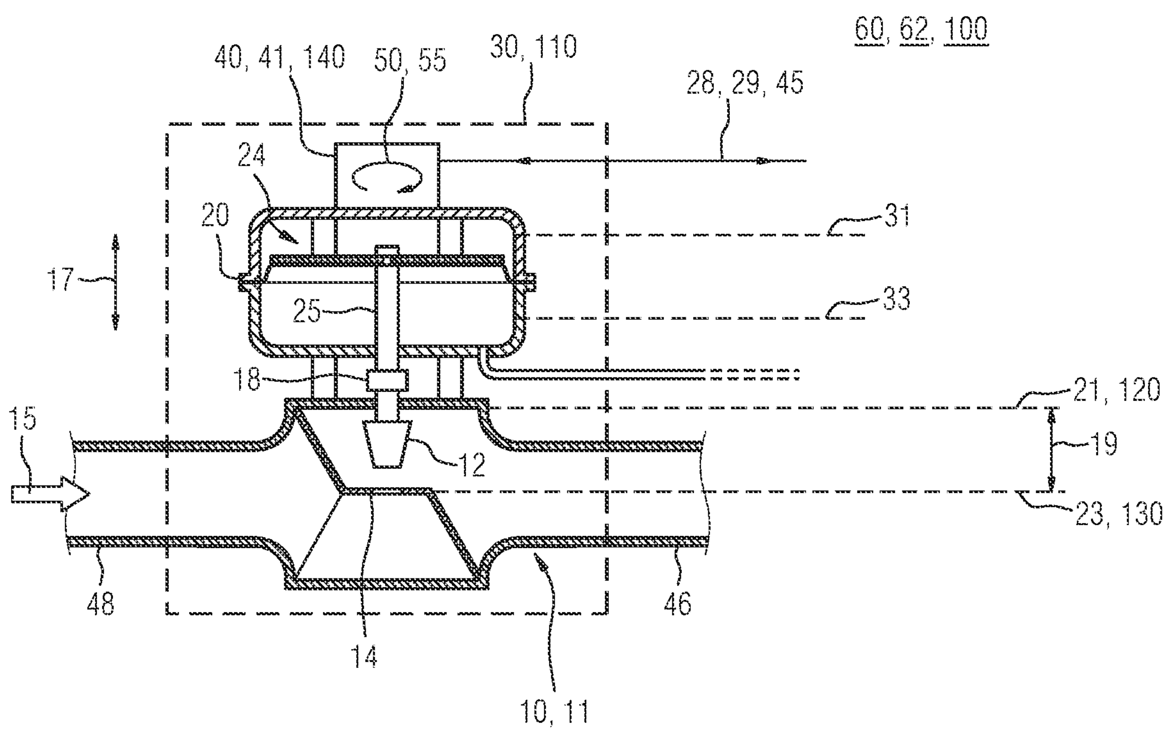
FIG. 1 schematically shows a first embodiment of the claimed operating method with the aid of a first embodiment of the claimed valve system.

A first embodiment of the claimed operating method 100 is illustrated schematically in FIG. 1 with the aid of a first embodiment of the inventive valve system 30. The valve system 30 comprises a valve 10 that is formed as a stroke-actuated valve 11 and is releasably coupled to a valve actuating apparatus 30 via a valve connection element 18. The valve 10 comprises a movable valve armature 12 that can be pressed against a valve seat 14. The valve 10 is arranged in a piping system 46 that comprises a plurality of pipes 48 through which a fluid 15 can flow. The valve actuating apparatus 20 comprises a pneumatic module 24 via which an actuating shaft 25 is movable along two opposite actuating directions 17. The valve actuating apparatus 20 is assigned a control unit 40 that is formed as a local control unit 41. The control unit 40 can be activated via a communicative data connection 28 and is equipped with a computer program product 50 that can be executed on the control unit 40. The operating method 100 in accordance with FIG. 1 is based on the fact that a first step 110 is completed, in which the valve system 30 is made available in an active operating state, i.e., is functionally assembled. A second step 120 follows, in which the actuating shaft 25 is actuated so as to perform a valve stroke 19. Here, a first end position 21 of the valve 10 is approached that corresponds essentially to a stop of the valve 10. The first end position 21 of the valve 10 is detected as a first absolute position 31 of the actuating shaft 25. The first absolute position 31 corresponds to the first end position 21 of the valve 10 by virtue of the rigid coupling between the valve actuating apparatus 20 and the valve armature 12.

Furthermore, the operating method 100 depicted in FIG. 1 comprises a third step 130 in which a second end position 23 of the valve 10 is approached. For this purpose, the actuating shaft 25 can be actuated via the valve actuating apparatus 20, i.e., essentially its pneumatic module 24, in order to perform a valve stroke 19. The valve stroke 19 in the third step 130 moves in the opposite direction to the valve stroke 19 in the second step 120. The second end position 23 of the valve 10 corresponds essentially to a further stop of the valve 10. Moreover, the third step 130 detects a second absolute position 33 which corresponds to the second end position 23. Furthermore, the operating method 100 comprises a fourth step 140 in which a design type of the valve 10 is identified. For this purpose, the computer program product 50 comprises an algorithm 55 that is established to evaluate the detected first and second absolute position 31, 33 of the valve actuating apparatus 20. The algorithm 55 can be formed as artificial intelligence, in particular as a trainable neuronal network, and/or cooperates with a database in which absolute positions of different design types of valves 10 are stored. A design type for which there is the greatest match with the aid of the detected first and/or second absolute position 31, 33, is identified as the design type of the valve 10 in the fourth step 140. Accordingly, a design type specification 45 is output via the communicative data connection 28. Based on the design type specification 45, a parameter data set 29 is retrieved, with the aid of which the valve actuating apparatus 20 is parameterized or configured via the control unit 40. The operating behavior of the valve 10 and/or of the valve actuating apparatus 20 is simulated in a simulation program product 60, not illustrated in detail. The operating method that is simulated by the simulation program product 60 can comprise the behavior of the valve 10 and/or of the valve actuating apparatus 20 during the operating method 100. The simulation program product 60 comprises for this purpose a digital image 62 in each case of the valve 10 and/or of the valve actuating apparatus 20. The simulation program product 60 can be formed as a digital twin.

Figure 2:
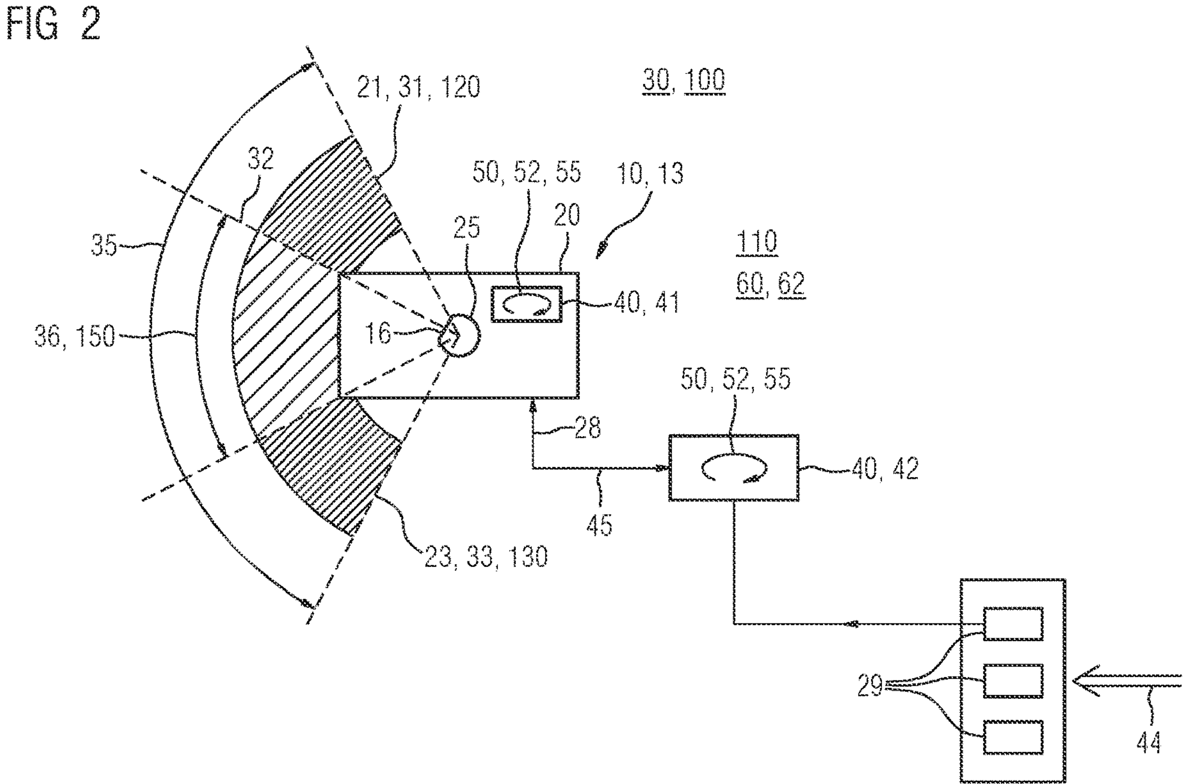
FIG. 2 schematically shows a second embodiment of the claimed operating method with the aid of a second embodiment of the claimed valve system.

FIG. 2 illustrates schematically a second embodiment of the inventive operating method 100 that is performed on a second embodiment of the inventive valve system 30. The valve system 30 comprises a valve 10 that is not illustrated in detail and is formed as a pivot-actuated valve 13. Likewise, the valve system 30 comprises a valve actuating apparatus 20 which is releasably coupled to the valve 10. The valve actuating apparatus 20 has an actuating shaft 25 that can be rotated via a suitable valve driver that is not illustrated in detail. The actuating shaft 18 has a flat 16 via which the valve 10 can be connected to the actuating shaft 25 in a discrete assembly position. The flat 16 makes it possible to also define a neutral position 32 of the valve actuating apparatus 20. The neutral position 32 corresponds to the position that the actuating shaft 25 assumes if it is not under the influence of actuating forces, such as from an associated valve driver. The valve actuating apparatus 20 also has a control unit 40 that is formed as a local control unit 41. A program part 52 of a computer program product 50 can be executed on the control unit 40 and it is possible to activate the valve actuating apparatus 20 via the program part. Furthermore, the valve system 30 comprises a control unit 40 that is formed as a superordinate control unit 42 and is coupled to the valve actuating apparatus 20 via a communicative data connection 28. A program part 52 can be executed on the superordinate control unit 42 and the program part cooperates via the communicative data connection 41 with the program part 52 on the local control unit 41. As a result of the cooperation of the program parts 52, the functionality of the computer program product 50 is achieved and the inventive operating method 100 is performed. In particular, an algorithm 55 with which the operating method 100 is implemented is functionally made available by the part program 52.

It is assumed in FIG. 2 that a first step 110 is completed, in which the valve system 30 is made available in an active operating state, in other words, is functionally assembled. In a second step 120, the actuating shaft 25 is actuated and a first end position 21 of the valve 10 is approached. The first end position 21 corresponds essentially to a stop of the valve 10. Corresponding to the first end position 21, a first absolute position 31 of the actuating shaft 25 is detected. A third step 130 follows in which a second end position 23 of the valve 10 is approached. The second end position 23 corresponds essentially to a further stop of the valve 10 that lies opposite the stop that is approached in the second step 120. In the third step 130, a second absolute position 33 of the actuating shaft 25 which corresponds to the second end position 23 is detected.

Moreover, the operating method 100 comprises a fourth step 140 in which with the aid of the detected first and second absolute position 31, 33 a design type of the valve 10 is determined with the aid of the algorithm 55. An angular field 35 between the first and second absolute position 31, 33 or between the first and second end position 21, 23 is divided in an asymmetrical manner with respect to the neutral position 32 of the actuating shaft 25. In order to identify the design type of the valve 10, the relative position of the neutral position 32 between the first and second absolute position 31, 33 is also taken into consideration in the fourth step 140. As a result, it is also possible to clearly distinguish valves 10 having an equally sized angular field 32 or identical absolute positions 31, 33.

Furthermore, the operating method 100 comprises a fifth step 150 in which an actuating range 36 of the valve actuating apparatus 20 is set. The actuating range 35 lies between the first and the second absolute position 31, 33 of the valve actuating apparatus 20 and correspondingly also between the first and second end position 21, 23 of the valve 10. It is possible by virtue of the actuating range 36 to define the position range that can be achieved in the intended operation of the valve 10. As a result, it is possible, for example, to avoid a wear-prone stop in an open position of the valve 10. The actuating range 36 can be predefined by a parameter set 29 which can be stored in the superordinate control unit 42.

For this purpose, the design type of the valve 10 that is identified in the fourth step 140 is transmitted as a design type specification 45 to the superordinate control unit 42 and further processed by the program part that is executed on the control unit. Appropriate parameter data sets 29 for the design type of the valve 10 are made available and provided to the user for selection. The parameter data sets 29 can be configured, for example, for different applications of the valve system 30 and can comprise specifications regarding the actuating range 25. By virtue of a user selection 44, one of the parameter data sets 29 on the superordinate control unit 42 is selected and transmitted to the local control unit 41 via the communicative data connection 28. At least the selected parameter data set 29 can comprise specifications regarding a maximum actuating speed of the actuating shaft 25 for the entire actuating range 36 or for segments (not illustrated in detail) of the actuating range 36. The operating behavior of the valve 10 and/or of the valve actuating apparatus 20 is simulated in a simulation program product 60 (not illustrated in detail). The operating method that is simulated by the simulation program product 60 can comprise the behavior of the valve 10 and/or of the valve actuating apparatus 20 during the operating method 100. For this purpose, the simulation program product 60 comprises a digital image 62 in each case of the valve 10 and/or the valve actuating apparatus 20. The simulation program product 60 can be formed as a digital twin.

Figure 3:
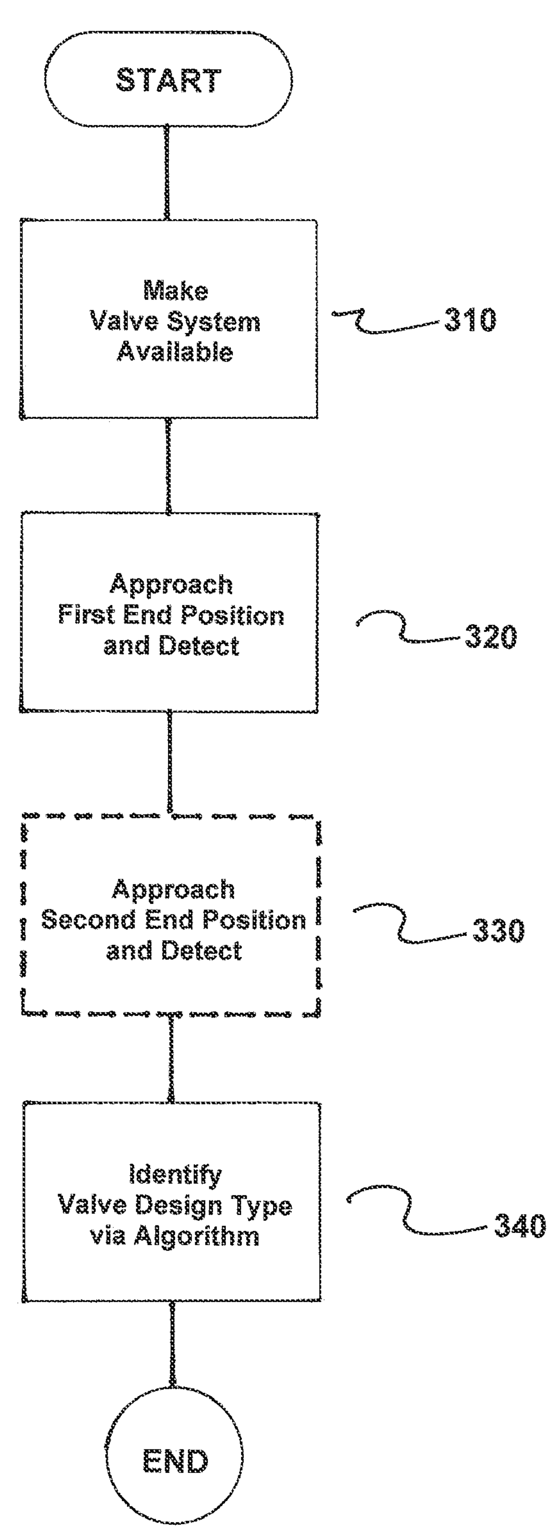
FIG. 3 is a flowchart of the method in accordance with the invention.

FIG. 3 is a flowchart of the operating method 100 for a valve system 30 comprising a valve 10 coupled in a torque-transmitting or tensile force-transmitting manner via an actuating shaft 25 to a valve actuating apparatus 20, where the valve 10 is moveable between a first and a second end position 21, 23.

The method comprises a) making the valve system 30 available in an active operating state, as indicated in step 310.

Next, b) the first end position 21 of the valve 10 is approached by actuating the valve actuating apparatus 20 and by detecting the first end position 21 as a first absolute position 31 of the actuating shaft 25, as indicated in step 320.

Alternative and and/or in addition, c) the second end position 23 of the valve 10 is approached by actuating the valve actuating apparatus 20 and detecting the second end position 23 as a second absolute position 33 of the actuating shaft 25, as indicated in step 330.

Next, d) a design type of the valve 10 is identified aided by either the first and/or second absolute position 31, 33 of the actuating shaft 25 via an algorithm 55, as indicated in step 340.

In accordance with the method, the valve actuating apparatus 20 either transmits an identified design type of the valve 10) to the controller 40 and/or is parameterized aided by the identified design type.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An operating method for a valve system comprising a valve coupled in a torque-transmitting or tensile force-transmitting manner via an actuating shaft to a valve actuating apparatus, the valve being moveable between a first and a second end position, the method comprising:

a) making the valve system available in an active operating state;

b) approaching the first end position of the valve by actuating the valve actuating apparatus and detecting the first end position as a first absolute position of the actuating shaft and/or;

c) approaching the second end position of the valve by actuating the valve actuating apparatus and detecting the second end position as a second absolute position of the actuating shaft; and d) identifying a design type of the valve aided by at least one of the first and second absolute position of the actuating shaft via an algorithm;

wherein the valve actuating apparatus at least one of (i) transmits an identified design type of the valve to the controller and (ii) is parameterized aided by the identified design type; and wherein an angular field which is delimited by the first and second absolute position of the actuating shaft is divided in an asymmetrical manner with respect to a neutral position of the actuating shaft.

2. The operating method as claimed in claim 1, wherein identifying the design type of the valve comprises distinguishing between a stroke-actuated valve and a pivot-actuated valve.

3. The operating method as claimed in claim 2, wherein an angular field which is delimited by the first and second absolute position of the actuating shaft is divided in an asymmetrical manner with respect to a neutral position of the actuating shaft.

4. The operating method as claimed in claim 1, wherein the algorithm is coupled to the valve actuating apparatus via a communicative data connection.

5. The operating method as claimed in claim 2, wherein the algorithm is coupled to the valve actuating apparatus via a communicative data connection.

6. The operating method as claimed in claim 1, wherein values of the first and second absolute position are interchanged with one another and/or signs of the first and second absolute position are reversed when identifying the design type of the valve.

7. The operating method as claimed in claim 1, wherein the actuating shaft is configured so as to predetermine an assembly position of a valve connection element.

8. The operating method as claimed in claim 7, wherein the actuating shaft includes at least of one a spring groove, a spring, a flat, an engagement end for a tool and an oriented molding which is configured so as to fasten the valve connection element.

9. The operating method as claimed in claim 1, further comprising:

e) setting an actuating range of the valve actuating apparatus;

wherein the actuating range lies between the first and second absolute position.

10. The operating method as claimed in claim 9, wherein the actuating range is predefined by a user input or is predefined in dependence upon the identified design type of the valve by at least one of a value table and the algorithm.

11. A computer program product for operating a valve system which comprises a valve and a valve actuating apparatus which is configured to identify a design type of the valve and which is implementable on a controller which is coupled to the valve actuating apparatus, the computer program product when executed by the controller performing the operating method as claimed in claim 1.

12. A controller for operating a valve actuating apparatus which is configured to output control commands to at least one valve drive, wherein the controller is configured as a local controller of the valve actuating apparatus or as a superordinate controller which is operatively couplable via a communicative data connection to the valve actuating apparatus;

wherein the controller is configured to:

a) make the valve system available in an active operating state;

b) approach a first end position of the valve by actuating the valve actuating apparatus and detecting the first end position as a first absolute position of the actuating shaft and/or;

c) approach a second end position of the valve by actuating the valve actuating apparatus and detecting the second end position as a second absolute position of the actuating shaft; and d) identify a design type of the valve aided by at least one of the first and second absolute position of the actuating shaft via an algorithm;

wherein the valve actuating apparatus at least one of (i) transmits an identified design type of the valve to the controller and (ii) is parameterized aided by the identified design type; and wherein an angular field which is delimited by the first and second absolute position of the actuating shaft is divided in an asymmetrical manner with respect to a neutral position of the actuating shaft.

13. A valve actuating apparatus comprising a driver having an actuating shaft which is configured to be operable coupled to a controller and a valve, wherein the actuating shaft includes at least one of a spring, a spring groove, a flat, an engagement end for a tool and an orientated molding so as to automatically identify a design type of a connected valve; and wherein an angular field which is delimited by a first and second absolute position of the actuating shaft is divided in an asymmetrical manner with respect to a neutral position of the actuating shaft.

14. A valve system, comprising a valve and a valve actuating apparatus which is coupled to a controller, wherein the controller is configured as claimed in claim 12 and the valve actuating apparatus comprise a driver having an actuating shaft which is configured to be operable coupled to the controller and the valve; and wherein the actuating shaft includes at least one of a spring, a spring groove, a flat, an engagement end for a tool and an orientated molding so as to automatically identify a design type of a connected valve.

15. A simulation program product for simulating an operational behavior of a valve system which comprises a valve and a valve actuating apparatus which is coupled to said valve, wherein the simulation program product has a digital image of the valve and/or of the valve actuating apparatus;

wherein the simulation program product is configured to simulate an operating method comprising:

a) making the valve system available in an active operating state;

b) approaching a first end position of the valve by actuating the valve actuating apparatus and detecting the first end position as a first absolute position of the actuating shaft and/or;

c) approaching a second end position of the valve by actuating the valve actuating apparatus and detecting the second end position as a second absolute position of the actuating shaft; and d) identifying a design type of the valve aided by at least one of the first and second absolute position of the actuating shaft via an algorithm;

wherein the valve actuating apparatus at least one of (i) transmits an identified design type of the valve to a control unit and (ii) is parameterized aided by the identified design type; and wherein an angular field which is delimited by the first and second absolute position of the actuating shaft is divided in an asymmetrical manner with respect to a neutral position of the actuating shaft.

* * * * *